April 7, 1925.                     1,532,238
E. M. FARRELL
HAIR CURLER
Filed June 23, 1924

Inventor
Edna M. Farrell.
Attorney.

Patented Apr. 7, 1925.

1,532,238

UNITED STATES PATENT OFFICE.

EDNA M. FARRELL, OF LOS ANGELES, CALIFORNIA.

HAIR CURLER.

Application filed June 23, 1924. Serial No. 721,740.

*To all whom it may concern:*

Be it known that I, EDNA M. FARRELL, a citizen of the United States, residing in Los Angeles, in the county of Los Angeles and State of California, have invented new and useful Improvements in Hair Curlers, of which the following is a detailed specification.

This invention has to do with a novel method of curling human hair, together with a novel type of curler. While, in its broader aspects, the invention is of use in different situations, it is particularly adaptable to the curling of eye lashes, and I will therefore describe the invention as put to this particular use, but do not wish thereby to create the inference that the invention is limited to this specific application.

In addition to the beautifying effect, curled eye lashes are of advantage to wearers of eye glasses, for lashes of any great length interfere with eye glass lenses unless the latter are set at a considerable distance from the eyes. When an eye glass bridge has not been properly designed to accommodate extra long lashes, the wiping of the lashes over the lenses each time the eyes are opened or shut causes continuous discomfort to the wearer. Furthermore, where the lenses are set far enough forward to avoid interference between said lenses and long lashes, the wearer is always conscious of the outline of the lenses, and the lenses often must be specially ground to give the proper focal characteristics due to the abnormal distance between point of vision and lenses. It has therefore become more or less of a prevailing custom to snip off the lashes so they clear the lenses, but this practice results in the lashes becoming stubby, stiff and unsightly.

Generally described, the means I employ for the purpose set forth comprises an adhesive or gummed sticker. The sticker is cut to conform with the shape of the eyelid and is of sufficient flexibility or pliability to allow it to fit smoothly over the lid so as to allow its application without causing the wearer undue discomfort and so it may engage all the lashes of the lid; yet it is sufficiently rigid to make its application easy, as will be apparent at a later point in the following detailed description.

In applying the sticker, the gummed side is moistened, the lashes are bent back over the eyelid, and the sticker pressed over the bent lashes and stuck to the lid. The initially moist condition of the gum somewhat softens the lashes, and the sticker holds them in their bent condition until they have become set, the moisture gradually drying out of the gum, but the sticker still adhering to the flesh of the lid. After the lashes are sufficiently set in their bent condition, the stickers are again moistened and removed from the lid. The time elapsing between sticker application and removal may be varied to suit the individual taste as to the degree of curl and set desired. Thus, certain individuals may leave the stickers on only for a matter of an hour or so, while other individuals may leave them in position over night.

I will describe my invention more fully, and will point out further objects and features of novelty thereof in the following detailed specification, reference being had to the accompanying drawings, in which.

Figure 1:
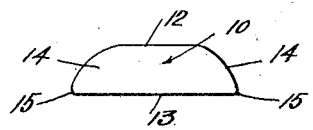
Fig. 1 is an elevation of the curler or sticker of my invention.

The curler of my invention comprises a tape or sticker 10, preferably made of very thin fabric, paper or the like. One side of the sticker is provided with an adhesive preparation, which is preferably of a nature requiring heat or moisture before it is in condition to cause adherence between the sticker and flesh. Of course, in considering the invention from the standpoint of a novel method, it lies within the scope of certain of the appended claims to supply the fabric and adhesive separately, the user applying the adhesive to the eyelid or sticker just before application of the curler. However, I prefer to apply the adhesive to the fabric at time of manufacture, as I am thereby able to produce a complete article of superior sales value.

While I may fashion the fabric stickers in various shapes, I find the illustrated configuration best suits the requirements. Generally speaking, a sticker of preferred shape conforms with the developed outline of the lower portion of a human eyelid, so, when the sticker is applied to the lid, it may fit smoothly over the lid, conforming to the curvature thereof.

The upper and lower edges 12 and 13, respectively, are substantially parallel, the length of edge 13 being approximately that of the lower edge of the average eyelid. The side edges 14 converge from edge 13 so upper edge 12 is considerably shorter than lower edge 13. The junction points of the side and lower edges are preferably rounded off at 15.

The sticker may be applied in a variety of manners, but I will first describe the method illustrated in Figs. 2 to 5 inclusive. However, I will first state that the gummed fabric is preferably sufficiently rigid to support itself in the position illustrated in Fig. 3 until it is pressed over and into contact with the eyelid; although the sticker is not so rigid as to buckle up or resist conformation to the eyelid during the later stages of application.

Figure 2:
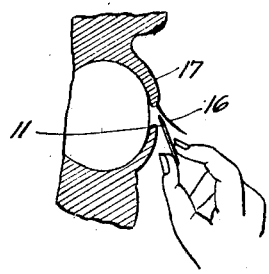
Fig. 2 is a diagrammatic section through an eyelid showing the first step taken in applying the curler.
Figure 3:
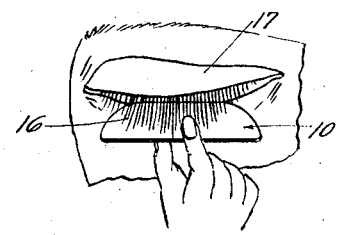
Fig. 3 shows the eyelid and sticker of Fig. 2 as viewed from the right thereof.
Figure 4:
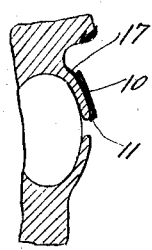
Fig. 4 is a view similar to Fig. 2 but showing the curler in adherence with the eyelid.
Figure 5:
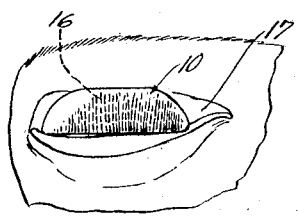
Fig. 5 is a view similar to Fig. 3 but showing the curler in adherence with the eyelid.

The sticker (with lower edge down, and gummed side towards the face) is moistened, grasped between the finger and thumb and thrust beneath the lashes 16 of the closed (or partially closed eye) as illustrated in Figs. 2 and 3. The sticker is then thrust straight up so its upper edge engages the eye lashes near their root ends. Continued upward movement of the sticker bends the lashes back upon lid 17, whereupon the sticker is pressed into firm contact with and smoothed over the lid, as shown in Figs. 4 and 5. The sticker is so held until it adheres, throughout its extent, to the eyelid. The shape of the sticker is such that it snugly fits the eyelid, and the eyes may be opened or closed without undue consciousness or discomfort, the sticker rolling back with the eyelid and partially out of sight when the eye is opened.

The moisture of the gum or adhesive somewhat softens the lashes, and the continued presence of the sticker holds the lashes in bent condition until they are set or curled.

When the lashes are sufficiently set (this may be a matter of minutes or hours depending upon the nature of the lashes and the degree of curl desired) the sticker is again moistened to soften the gum, whereupon the curler is removed. It will be understood, however, that even though the moisture of the gum, when the sticker is first applied, be not sufficient to soften the lashes, the natural oil of the lashes and the inherent flexibility thereof permits the hair to be bent back and curled in the manner described.

Adhesives have been found that admit of free sticker withdrawal without plucking the lashes or abrading the skin.

I find that lashes treated by my method retain their curl for a very considerable length of time, and that it is only after repeated and frequent contact with water that they finally begin to straighten out and assume their normal position.

Figure 6:
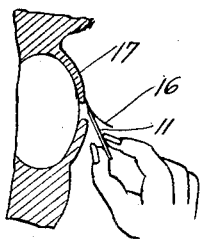
Figs. 6 and 7 are similar to Figs. 2 and 3, respectively, except that they illustrate a slightly different mode of application.
Figure 7:
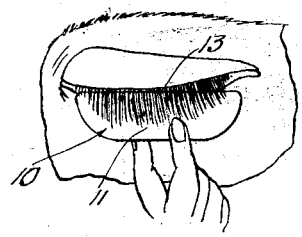

In Figs. 6 and 7 I have illustrated a slightly different mode of curler application. The curler is moistened, held with the longer edge 13 up and with the gummed side away from the face, and inserted beneath the lashes as shown in Figs. 6 and 7. By then turning the curler upwardly and towards the face so the gummed side is brought into contact with the eyelid, it will be seen that the lashes are caught between the lid and curler in the manner illustrated in Figs. 4 and 5.

It will be understood that the drawings and description are to be considered merely as illustrative of and not restricted on the broader claims appended hereto, for it will be readily seen that various changes may be made over the disclosure without departing from the spirit and scope of my invention.

Having described a preferred form of my invention, I claim:

1. An eyelash curler embodying a sheet of flexible material shaped to conform with a portion of a human eyelid.

2. An eyelash curler embodying a sheet of flexible material shaped to conform with a portion of a human eyelid, and means for removably affixing the sheet to the eyelid.

In witness that I claim the foregoing I have hereunto subscribed my name this 7 day of June, 1924.

EDNA M. FARRELL.